(12) United States Patent
Sprague et al.

(10) Patent No.: US 9,052,564 B2
(45) Date of Patent: Jun. 9, 2015

(54) ELECTROPHORETIC DISPERSION

(71) Applicant: SiPix Imaging, Inc., Fremont, CA (US)

(72) Inventors: Robert A. Sprague, Saratoga, CA (US);
Bo-Ru Yang, Banqiao (TW); Peter Laxton, Alameda, CA (US)

(73) Assignee: E Ink California, LLC, Fremont, CA (US)

( * ) Notice: Subject to any disclaimer, the term of this patent is extended or adjusted under 35 U.S.C. 154(b) by 94 days.

(21) Appl. No.: 13/847,888

(22) Filed: Mar. 20, 2013

(65) Prior Publication Data

US 2013/0250400 A1 Sep. 26, 2013

Related U.S. Application Data

(60) Provisional application No. 61/613,833, filed on Mar. 21, 2012.

(51) Int. Cl.
*G02B 26/00* (2006.01)
*G09G 3/34* (2006.01)
*G02F 1/167* (2006.01)

(52) U.S. Cl.
CPC ........ *G02F 1/167* (2013.01); *G02F 2001/1678* (2013.01)

(58) Field of Classification Search
USPC .............. 359/296; 345/107; 430/32; 204/600
See application file for complete search history.

(56) References Cited

U.S. PATENT DOCUMENTS

| 6,693,620 | B1 | 2/2004 | Herb et al. | |
|---|---|---|---|---|
| 6,930,818 | B1 | 8/2005 | Liang et al. | |
| 7,170,670 | B2 | 1/2007 | Webber | |
| 7,679,814 | B2 | 3/2010 | Paolini, Jr. | |
| 7,869,118 | B2 * | 1/2011 | Wang et al. | 359/296 |
| 7,933,062 | B2 * | 4/2011 | Masuzawa et al. | 359/296 |
| 8,462,423 | B2 | 6/2013 | Farrand et al. | |
| 8,665,513 | B2 * | 3/2014 | Hsiao et al. | 359/296 |
| 2011/0168558 | A1 | 7/2011 | Fransaer et al. | |
| 2011/0216392 | A1 | 9/2011 | Baisch et al. | |

FOREIGN PATENT DOCUMENTS

WO  WO 01/67170    9/2001
WO  WO 02-21201 A3  3/2002

OTHER PUBLICATIONS

U.S. Appl. No. 61/613,833, filed Mar. 21, 2012, Sprague
Nikkei Microdevices. (Dec. 2002) Newly-Developed Color Electronic Paper Promises—Unbeatable Production Efficiency. *Nikkei Microdevices*, p. 3. (in Japanese, with English translation).
Liang, R.C., Hou, J., & Zang, H.M. (Dec. 2002) Microcup Electrophoretic Displays by Roll-to-Roll Manufacturing Processes. *IDW*, EP2-2, 1337-1340, Dec. 2002.

(Continued)

*Primary Examiner* — Mohammed Hasan
(74) *Attorney, Agent, or Firm* — Perkins Coie LLP

(57) ABSTRACT

The present invention is directed to an electrophoretic dispersion, in particular, an electrophoretic dispersion comprising uncharged or lightly charged additive particles for improving bistability of an electrophoretic display. The average diameter of the additive particles is about 1% to about 25% of the average hydrodynamic diameter of the charged pigment particles.

16 Claims, 1 Drawing Sheet

(56) References Cited

OTHER PUBLICATIONS

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.
Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.
Liang, R.C., Hou, J., Zang, H.M., & Chung, J. (Feb. 2003). *Passive Matrix Microcup® Electrophoretic Displays*. Paper presented at the IDMC, Taipei, Taiwan.
Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.
Chen, S.M. (May 2003) The New Application and the Dynamics of Companies. *TRI*. 1-10. (in Chinese, English abstract attached), May 2003.
Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.
Lee, H., & Liang, R.C. (Jun. 2003) SiPix Microcup® Electronic Paper—An Introduction. *Advanced Display*, Issue 37, 4-9 (in Chinese, English abstract attached).
Chen, S.M. (Jul. 2003) The Applications for the Revolutionary Electronic Paper Technology. *OPTO News & Letters*, 102, 37-41. (in Chinese, English abstract attached).
Zang, H.M., & Liang, R.C. (2003) Microcup Electronic Paper by Roll-to-Roll Manufacturing Processes. *The Spectrum*, 16(2), 16-21, July.
Kleper, M., Miller, P., Miller L. (Oct. 2003) An Investigation of the Emerging and Developing Technologies Related to the Generation Beyond Print-on-Paper. *Advanced Display Technologies*, Oct. 2003, pp. 13-15, Rochester Institute of Technology (R.I.T.).
Allen, K. (Oct. 2003). Electrophoretics Fulfilled. *Emerging Displays Review: Emerging Display Technologies*, Monthly Report—Oct. 2003, 9-14.
Zang, H.M. (Oct. 2003). *Microcup® Electronic Paper by Roll-to-Roll Manufacturing Processes*. Presentation conducted at the Advisory Board Meeting, Bowling Green State University, Ohio, USA.
Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.
Ho, C., & Liang, R.C. (Dec. 2003). *Microcup® Electronic Paper by Roll-to-Roll Manufacturing Processes*. Presentation conducted at FEG, Nei-Li, Taiwan.
Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.
Zang, H.M. (Feb. 2004). *Microcup Electronic Paper*. Presentation conducted at the Displays & Microelectronics Conference of U.S. Display Consortium, Phoenix, Arizona, USA.
Wang, X., Kiluk, S., Chang, C., & Liang, R.C. (Feb. 2004). Mirocup® Electronic Paper and the Converting Processes. *ASID*, 10.1.2-26, 396-399, Nanjing, China.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Liang, R.C. (Apr. 2004). *Microcup Electronic Paper by Roll-to-Roll Manufacturing Process*. Presentation at the Flexible Displays & Electronics 2004 of Intertech, San Fransisco, California, USA.
Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.
Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).
Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.
Liang, R.C. (Oct. 2004) *Flexible and Roll-able Displays/Electronic Paper—A Technology Overview*. Paper presented at the METS 2004 Conference in Taipei, Taiwan.
Bardsley, J.N. & Pinnel, M.R. (Nov. 2004) Microcup™ Electrophoretic Displays. *USDC Flexible Display Report*, 3.1.2. pp. 3-12-3-16.
Ho, Candice. (Feb. 1, 2005) *Microcupt® Electronic Paper Device and Application*. Presentation conducted at USDC 4th Annual Flexible Display Conference 2005.
Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.
Liang, R.C., (Feb. 2005) *Flexible and Roll-able Displays/Electronic Paper—A Brief Technology Overview*. Flexible Display Forum, 2005, Taiwan.
Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.
Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.
Wang, X., Zang, H.M. And Li, P. (Jun. 2006) Roll-to-Roll Manufacturing Process for Full Color Electrophoretic film. *SID Digest*, 2006, pp. 1587-1589.
Zang, H.M. (Sep. 2006) *Monochrome and Area Color Microcup® EPDs by Roll-to-Roll Manufacturing Process*. Presentation conducted at the Fourth Organic Electronics Conference and Exhibition (OEC-06), Sep. 25-27, 2006, Frankfurt, Germany.
Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.
Zang, H.M. (Feb.2007) *Developments in Microcup® Flexible Displays*. Presentation conducted at the 6th Annual Flexible Display and Microelectronics Conference, Phoenix, AZ Feb. 6-8.
Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.
Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging.
PCT/US2013/033063 PCT Notification of Transmittal of the International Search Report and the Written Opinion of the International Searching Authority, or the Declaration, mailed in Jul. 4, 2013.

\* cited by examiner

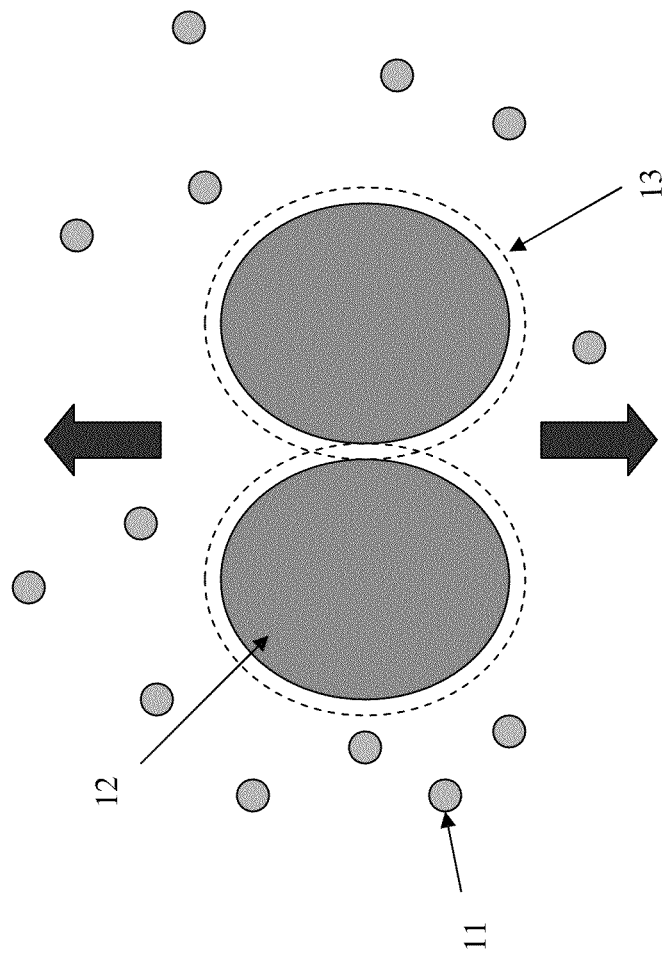

ELECTROPHORETIC DISPERSION

This application claims priority to U.S. Provisional Application No. 61/613,833, filed Mar. 21, 2012; the content of which is incorporated herein by reference in its entirety.

FIELD OF THE INVENTION

The present invention is directed to an electrophoretic dispersion, in particular, an electrophoretic dispersion comprising uncharged or lightly charged additive particles for improving bistability of an electrophoretic display.

BACKGROUND OF THE INVENTION

An electrophoretic display (EPD) is a non-emissive device based on the electrophoresis phenomenon influencing charged pigment particles suspended in a dielectric solvent. An EPD typically comprises a pair of spaced-apart plate-like electrodes. At least one of the electrode plates, typically on the viewing side, is transparent. An electrophoretic dispersion composed of a dielectric solvent with charged pigment particles dispersed therein is enclosed between the two electrode plates.

An electrophoretic dispersion may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate to the opposite plate, thereby reversing the color.

Alternatively, an electrophoretic dispersion may comprise two types of pigment particles of contrasting colors and carrying opposite charges and the two types of pigment particles are dispersed in a clear solvent or solvent mixture. In this case, when a voltage difference is imposed between the two electrode plates, the two types of pigment particles would move to opposite ends (top or bottom) in a display cell. Thus one of the colors of the two types of the pigment particles would be seen at the viewing side of the display cell.

For all types of electrophoretic display, the dispersion contained within the individual display cells of the display is one of the most crucial parts of the device. The composition of the dispersion determines, to a large extent, the lifetime, contrast ratio, switching rate and bistability of the device.

BRIEF DESCRIPTION OF THE DRAWINGS

FIG. 1 depicts how the additive particles may induce flocculation or weak agglomeration of the charged pigment particles.

SUMMARY OF THE PRESENT INVENTION

The present invention is directed to an electrophoretic dispersion comprising charged pigment particles and uncharged or lightly charged additive particles dispersed in a solvent or solvent mixture wherein the average diameter of the additive particles is about 1% to about 25% of the average hydrodynamic diameter of the charged pigment particles.

In one embodiment, the dispersion comprises two types of charged pigment particles having opposite charge polarities and of contrasting colors.

In one embodiment, the additive particles are formed from a polymer, metal or metal oxide.

In one embodiment, the additive particles are formed from polystyrene, poly(2-vinylnapthalene), polymethylmethacrylate, titanium dioxide, silicon dioxide or gold.

In one embodiment, the concentration of the additive particles is from about 5% to about 40% by volume of the dispersion.

In one embodiment, the charged pigment particles have a hydrodynamic diameter in the range of 0.1 μm to 1 μm.

In one embodiment, the dispersion further comprises non-charged or lightly charged neutral buoyancy particles.

In one embodiment, the non-charged or lightly charged neutral buoyancy particles are formed from a polymeric material.

In one embodiment, the non-charged or lightly charged neutral buoyancy particles are formed from polyacrylate, polymethacrylate, polystyrene, polyaniline, polypyrrole, polyphenol or polysiloxane.

In one embodiment, the non-charged or lightly charged neutral buoyancy particles are formed from poly(pentabromophenyl methacrylate), poly(2-vinylnapthalene), poly(naphthyl methacrylate), poly(alpha-methystyrene), poly(N-benzyl methacrylamide) or poly(benzyl methacrylate).

In one embodiment, the refractive index of the uncharged or lightly charged neutral buoyancy particles is different from that of the solvent or solvent mixture in which the particles are dispersed.

In one embodiment, the average diameter of the uncharged or lightly charged neutral buoyancy particles is in the range of about 100 nanometers to about 5 microns.

In one embodiment, the average diameter of the additive particles is smaller than the average diameter of the neutral buoyancy particles.

In one embodiment, the concentration of the uncharged or lightly charged neutral buoyancy particles in the electrophoretic dispersion is more than 2.5% by weight, but not exceeding about 25% by weight.

In one embodiment, the dispersion further comprises a charge controlling agent.

DETAILED DESCRIPTION OF THE INVENTION

Prior to the present invention, it was proposed that image bistability of an electrophoretic display may be improved by dissolving a polymer into an electrophoretic dispersion. However the usefulness of this approach is limited because dissolving a polymer in the dispersion would increase the viscosity of the dispersion, resulting in an increase in the switching time.

The present inventors now have found that by adding uncharged or lightly charged particles into an electrophoretic dispersion, the bistability of an electrophoretic display may be improved, without significantly affecting the switching speed. For brevity, this type of particles is referred to as "additive particles" throughout this application.

The term "lightly charged" is defined as having a charge which is less than 50%, preferably less than 25% and more preferably less than 10%, of the average charge carried by the positively charged pigment particles or negatively charged pigment particles.

The additive particles may be prepared from a material such as a polymer, metal, metal oxide or the like. For example, they may be formed from polystyrene, poly(2-vinylnapthalene), polymethylmethacrylate, titanium dioxide, silicon dioxide or gold.

Spherical polymer particles may be prepared in the usual way. For example, in dispersion polymerization, a stabilizing agent which is compatible with the electrophoretic dispersion may be added. In this case, the size of the polymer particles can be precisely controlled by the recipe of the polymerization reaction. Specifically, a higher ratio of the stabilizing agent to the monomer tends to result in smaller particles.

Silica particles of controlled size may be prepared by the Stöber process and its modern variants.

Metal nanoparticles, on the other hand, may be synthesized by reduction of an aqueous metal salt solution, for example, citrate synthesis of gold nanoparticles. In the case of metal particles, any of several techniques for size control may be used. For example, higher concentration of a reducing agent tends to result in smaller particles. In the case of metal and metal oxide particles, care must also be taken to use an appropriate stabilizing agent for the eletrophoretic dispersion.

FIG. 1 depicts how the additive particles (11) may induce flocculation or weak agglomeration of the charged pigment particles (12). In this FIGURE, the charged pigment particles (12) are shown to have a depletion zone (13) where the additive particles (11) are excluded due to their size. During switching, an electric field forces the charged pigment particles to be packed densely, which squeezes out the additive particles from the zone between the charged pigment particles. In the packed state, the energy state of the system tends to be at a lower level than when the charged pigment particles are dispersed. This is due to the fact that the high energy depletion zones around the charged pigment particles overlap, thus reducing the total depletion zone volume. The resulting packed state therefore is stable and resists change, for example, spontaneous redistribution of the charged pigment particles by Brownian motion which in an electrophoretic display is manifest as an image state decay, known as bistability loss.

When a change of the display state is desired, a reverse electric field is applied which pulls the charged pigment particles apart, allowing the additive particles to become uniformly dispersed among the charged pigment particles. Because of the depletion flocculation energy, this change in state requires a voltage to separate the charged pigment particles. But once that happens, the charged pigment particles move through the dispersion which has a relatively low viscosity associated with the uniformly dispersed state.

The additive particles have certain characteristics. First of all, the particles must be colloidally stable against agglomeration, sedimentation (or creaming) or adsorption. In other words, they must energetically prefer the dispersed state over being adsorbed onto the charged pigment particles or walls that surround the electrophoretic dispersion.

Secondly, they must maintain a specific size relative to the charged pigment particles. The average diameter of the additive particles is about 1% to about 25% of the average hydrodynamic diameter of the charged pigment particles. While the primary particle size of the charged pigment particles is often in the range of 50 nm to 500 nm, their dispersed hydrodynamic size is often substantially larger. The charged pigment particles usually have an average hydrodynamic diameter in the approximate range of 0.1 µm to 1 µm. It is this larger hydrodynamic size that must be considered when additive particles are included. Therefore, the additive particles, in most cases, are nanoparticles.

Thirdly, the concentration of the additive particles should be controlled within from about 5% to about 40%, preferably about 10% to about 40%, by volume of the dispersion. This concentration range is critical in order for the additive particles to be effective in improving bistability of an electrophoretic display.

In addition, the refractive index of the additive particles is preferably similar to that of the solvent or solvent mixture in which they are dispersed.

A final consideration unique to an electrophoretic display is that it is preferred that the particles are non-charged or lightly charged (i.e., substantially less charged than the charged pigment particles).

The additive particles may be present in an electrophoretic dispersion comprising one type of charged pigment particles or in an electrophoretic dispersion comprising two types of charged pigment particles.

The charged pigment particles may be formed from an inorganic pigment, such as $TiO_2$, $ZrO_2$, $ZnO$, $Al_2O_3$, CI pigment black 26 or 28 or the like (e.g., manganese ferrite black spinel or copper chromite black spinel). They may also be formed from an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher.

The charged pigment particles may also be particles coated with a polymer layer on their surface, and the polymer coating can be prepared through various conventionally known polymerization techniques.

The charged pigment particles may carry a natural charge or are charged through the presence of a charge controlling agent.

The solvent or solvent mixture in which the charged pigment particles are dispersed preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200). The solvent or solvent mixture may be colored by a dye or pigment.

In addition to the non-charged or lightly charged additive particles, the dispersion may further comprise non-charged or lightly charged neutral buoyancy particles.

The term "neutral buoyancy" refers to particles which do not rise or fall with gravity. In other words, the particles would float in the dispersion between the two electrode plates. In one embodiment, the density of the neutral buoyancy particles may be the same as the density of the solvent or solvent mixture in which they are dispersed.

The uncharged or lightly charged neutral buoyancy particles may be formed from a polymeric material. The polymeric material may be a copolymer or a homopolymer. Examples of the polymeric material for the uncharged or lightly charged neutral buoyancy particles may include, but are not limited to, polyacrylate, polymethacrylate, polystyrene, polyaniline, polypyrrole, polyphenol, polysiloxane or the like. More specific examples of the polymeric material may include, but are not limited to, poly(pentabromophenyl methacrylate), poly(2-vinylnapthalene), poly(naphthyl methacrylate), poly(alpha-methystyrene), poly(N-benzyl methacrylamide) or poly(benzyl methacrylate). These materials are suitable for the neutral buoyancy particles in the one particle system and the two particle system.

More preferably, the uncharged or lightly charged neutral buoyancy particles are formed from a polymer which is not soluble in the dielectric solvent of the display dispersion, and also has a high refractive index. In one embodiment, the refractive index of the uncharged or lightly charged neutral buoyancy particles is different from that of the solvent or solvent mixture in which the particles are dispersed. However, typically the refractive index of the uncharged or lightly charged neutral buoyancy particles is higher than that of the solvent or solvent mixture. In some cases, the refractive index of the uncharged or lightly charged neutral buoyancy particles may be above 1.45.

In one embodiment, the materials for the uncharged or lightly charged neutral buoyancy particles may comprise an aromatic moiety.

The uncharged or lightly charged neutral buoyancy particles may be prepared from monomers through polymerization techniques, such as suspension polymerization, dispersion polymerization, seed polymerization, soap-free polymerization, emulsion polymerization or physical method, including inverse emulsification-evaporation process. The monomers are polymerized in the presence of a dispersant. The presence of the dispersant allows the polymer particles to be formed in a desired size range and the dispersant may also form a layer physically or chemically bonded to the surface of the polymer particles to prevent the particles from agglomeration.

The dispersants preferably has a long chain (of at least eight atoms), which may stabilize the polymer particles in a hydrocarbon solvent. Such dispersants may be an acrylate-terminated or vinyl-terminated macromolecule, which are suitable because the acrylate or vinyl group can co-polymerize with the monomer in the reaction medium.

One specific example of the dispersant is acrylate terminated polysiloxane (Gelest, MCR-M17, MCR-M22), Another type of suitable dispersants is polyethylene macromonomers, as shown below:

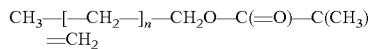

The backbone of the macromonomer may be a polyethylene chain and "n" may be 30-200. The synthesis of this type of macromonomers may be found in Seigou Kawaguchi et al, Designed Monomers and Polymers, 2000, 3, 263.

If the dispersion system is fluorinated, the dispersants are then preferably also fluorinated.

Alternatively, the uncharged or lightly charged neutral buoyancy particles may also be formed from a core particle coated with a polymeric shell and the shell may be formed, for example, from any of the polymeric material identified above for the neutral buoyancy particles.

The core particle may be of an inorganic pigment or an organic pigment as described above.

In the case of core-shell uncharged or lightly charged neutral buoyancy particles, they may be formed by a microencapsulation method, such as coacervation, interfacial poly-condensation, interfacial cross-linking, in-suit polymerization or matrix polymerization.

The average diameter of the uncharged or lightly charged neutral buoyancy particles is preferably in the range of about 100 nanometers to about 5 microns. In one embodiment, the average diameter of the additive particles is smaller than the average diameter of the neutral buoyancy particles.

In one embodiment of this aspect of the present invention, the uncharged or lightly charged neutral buoyancy particles added to the dispersion may have a color substantially the same as the color of one of the two types of charged pigment particles. For example, in a display dispersion, there may be charged black particles, charged white particles, the uncharged or lightly charged additive particles and uncharged or lightly charged neutral buoyancy particles and the uncharged or lightly charged neutral buoyancy particles may be either white or black.

If the uncharged or lightly charged neutral buoyancy particles are white, they may enhance the reflectivity of the display. If they are black, they may enhance the blackness of the display.

In another embodiment, the uncharged or lightly charged neutral buoyancy particles may have a color substantially different from the color of either one of the two types of charged pigment particles.

The presence of the uncharged or lightly charged neutral buoyancy particles, especially if they are formed from a reflective material, increases reflection of the incident light; thus improving the contrast ratio.

In a further embodiment of the present invention, the concentration of the uncharged or lightly charged neutral buoyancy particles in an electrophoretic dispersion is preferably more than 2.5% by weight, but not exceeding about 25% by weight. In another embodiment, the concentration of the uncharged or lightly charged neutral buoyancy particles is preferably in a range between about 3% to about 15% by weight and more preferably in a range between about 3% to about 10% by weight.

The term "about" refers to a range which is ±5% of the indicated value.

The electrophoretic dispersion of the present invention, in addition to the uncharged or lightly charged additive particles and uncharged or lightly charged neutral buoyancy particles, may also comprise other additives such as a charge controlling agent. The charge control agent (CCA) used in all embodiments of the present invention is compatible with the solvent in the electrophoretic dispersion and may interact with the surface of the charged particles to effectively generate either positive or negative charge for the particles. Useful charge control agents include, but are not limited to, sodium dodecylbenzenesulfonate, metal soap, polybutene succinimide, maleic anhydride copolymers, vinylpyridine copolymers, vinylpyrrolidone copolymer, (meth)acrylic acid copolymers or N,N-dimethylaminoethyl(meth)acrylate copolymers), Alcolec LV30 (soy lecithin), Petrostep B100 (petroleum sulfonate) or B70 (barium sulfonate), Solsperse 17000 (active polymeric dispersant), Solsperse 9000 (active polymeric dispersant), OLOA 11000 (succinimide ashless dispersant), OLOA 1200 (polyisobutylene succinimides), Unithox 750 (ethoxylates), Petronate L (sodium sulfonate), Disper BYK 101, 2095, 185, 116, 9077 & 220 and ANTI-TERRA series.

A further aspect of the present invention is directed to an electrophoretic display wherein display cells are filled with any of the display dispersions as described in the present application.

The term "display cell" refers to a micro-container filled with a display dispersion. A display cell may be a microcup as described in U.S. Pat. No. 6,930,818, the content of which is incorporated herein by reference in its entirety.

A display cell may also be any other micro-containers (e.g., microcapsules or microchannels), regardless of their shapes or sizes. All of these are within the scope of the present application, as long as the micro-containers are filled with a display dispersion.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An electrophoretic dispersion comprising charged pigment particles and uncharged or lightly charged additive particles dispersed in a solvent or solvent mixture, wherein
    a) the average diameter of the additive particles is about 1% to about 25% of the average hydrodynamic diameter of the charged pigment particles, and
    b) the additive particles are excluded from depletion zones around the charged pigment particles to induce flocculation of the charged pigment particles.

2. The dispersion of claim 1, wherein the concentration of the additive particles is from about 5% to about 40% by volume of the dispersion.

3. The dispersion of claim 1, wherein the concentration of the additive particles is from about 10% to about 40% by volume of the dispersion.

4. The dispersion of claim 1, which comprises two types of charged pigment particles having opposite charge polarities and of contrasting colors.

5. The dispersion of claim 1, wherein the additive particles are formed from a polymer, metal or metal oxide.

6. The dispersion of claim 1, wherein the additive particles are formed from polystyrene, poly(2-vinylnapthalene), polymethylmethacrylate, titanium dioxide, silicon dioxide, or gold.

7. The dispersion of claim 1, wherein the charged pigment particles have a hydrodynamic diameter in the range of 0.1 µm to 1 µm.

8. The dispersion of claim 1, further comprising non-charged or lightly charged neutral buoyancy particles.

9. The dispersion of claim 8, wherein the non-charged or lightly charged neutral buoyancy particles are formed from a polymeric material.

10. The dispersion of claim 8, wherein the non-charged or lightly charged neutral buoyancy particles are formed from polyacrylate, polymethacrylate, polystyrene, polyaniline, polypyrrole, polyphenol, or polysiloxane.

11. The dispersion of claim 8, wherein the non-charged or lightly charged neutral buoyancy particles are formed from poly(pentabromophenyl methacrylate), poly(2-vinylnapthalene), poly(naphthyl methacrylate), poly(alpha-methystyrene), poly(N-benzyl methacrylamide), or poly(benzyl methacrylate).

12. The dispersion of claim 8, wherein the refractive index of the uncharged or lightly charged neutral buoyancy particles is different from that of the solvent or solvent mixture in which the particles are dispersed.

13. The dispersion of claim 8, wherein the average diameter of the uncharged or lightly charged neutral buoyancy particles is in the range of about 100 nanometers to about 5 microns.

14. The disersion of claim 13, wherein the average diameter of the additive particles is smaller than the average diameter of the neutral buoyancy particles.

15. The dispersion of claim 8, wherein the concentration of the uncharged or lightly charged neutral buoyancy particles in the electrophoretic dispersion is more than 2.5% by weight, but not exceeding about 25% by weight.

16. The dispersion of claim 8, further comprising a charge controlling agent.

* * * * *